M. C. WHITE & O. C. DURYEA.
POWER APPLIANCE.
APPLICATION FILED JUNE 11, 1908.

911,187.

Patented Feb. 2, 1909.
5 SHEETS—SHEET 1.

Witnesses:
H. N. Kirkby
Julia Townsend

Inventors:
Morris C. White
Otho C. Duryea
by James R. Townsend
their Atty.

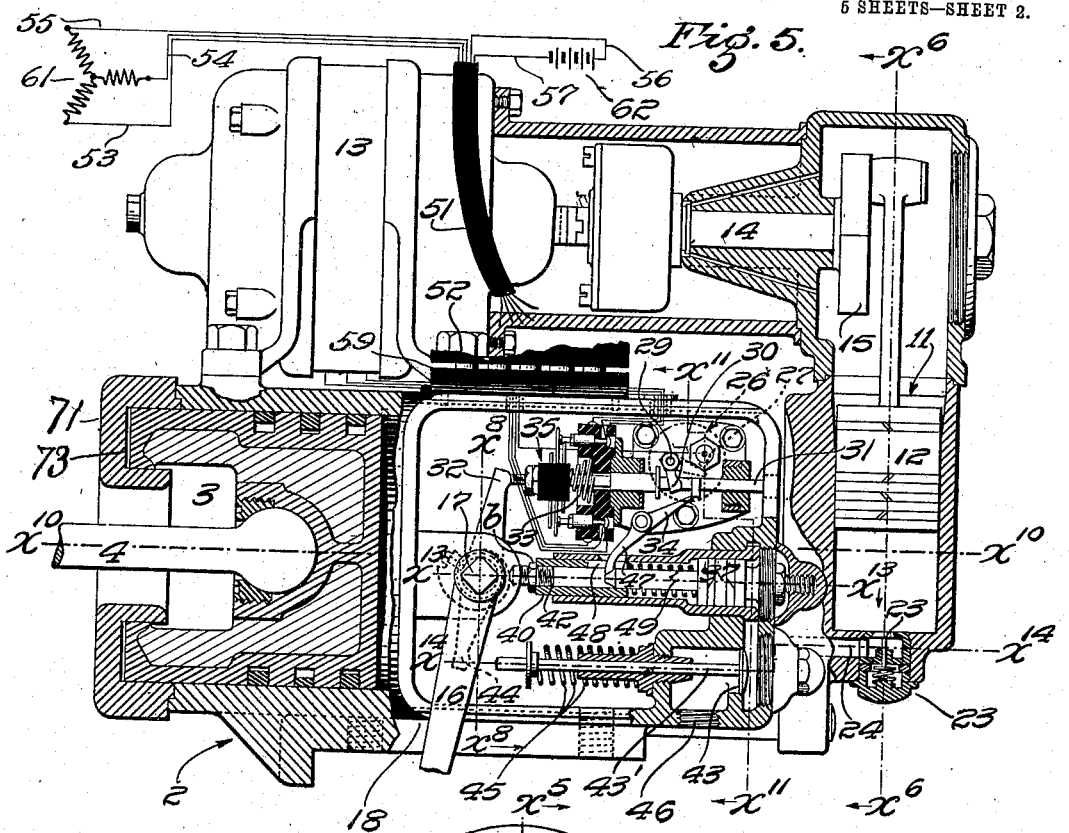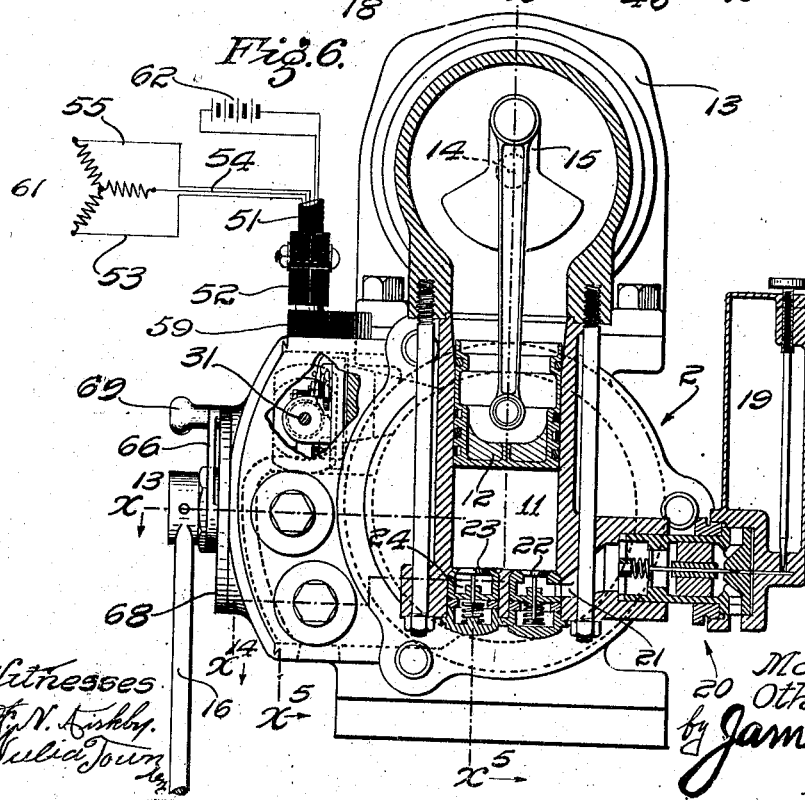

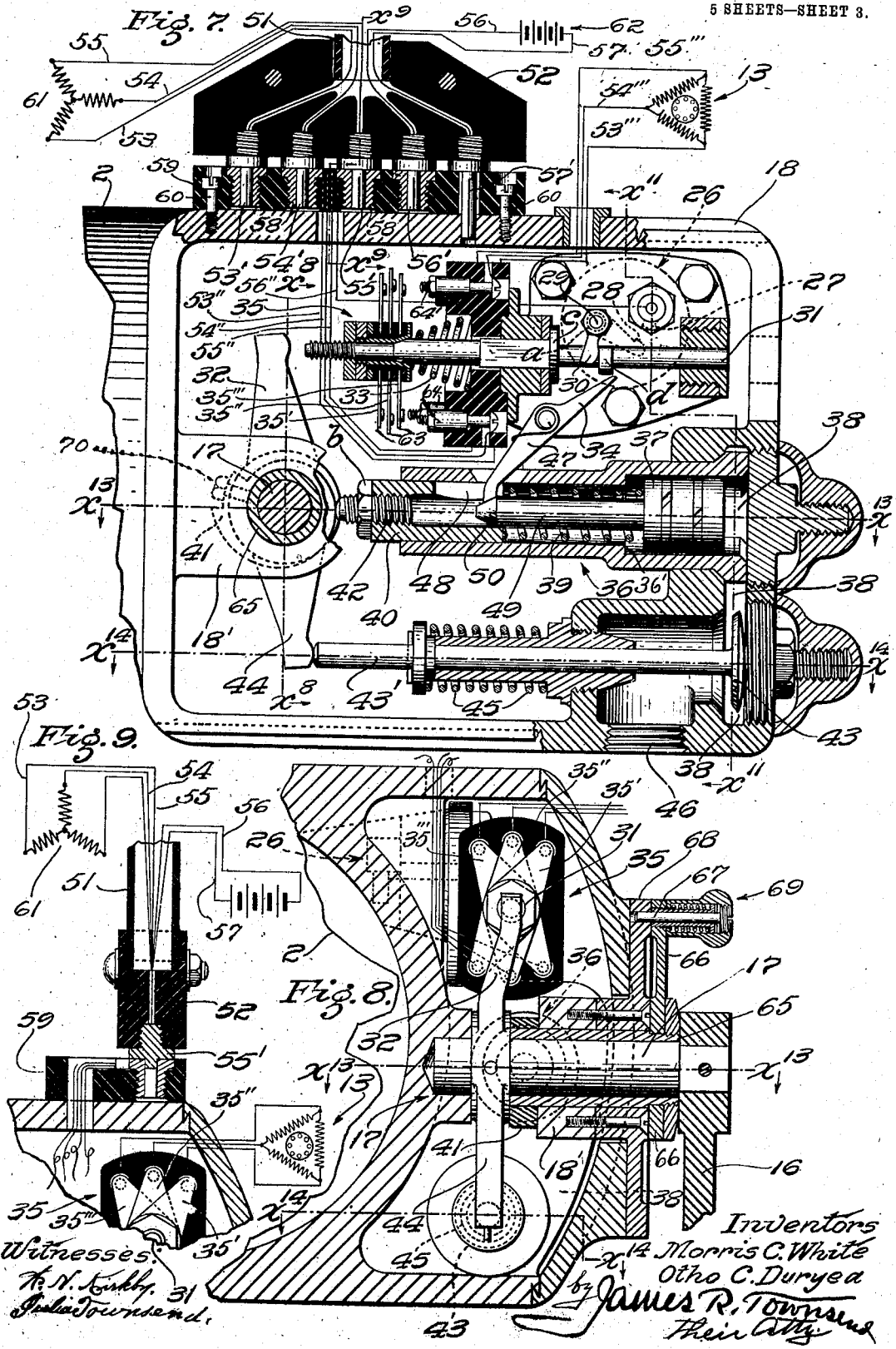

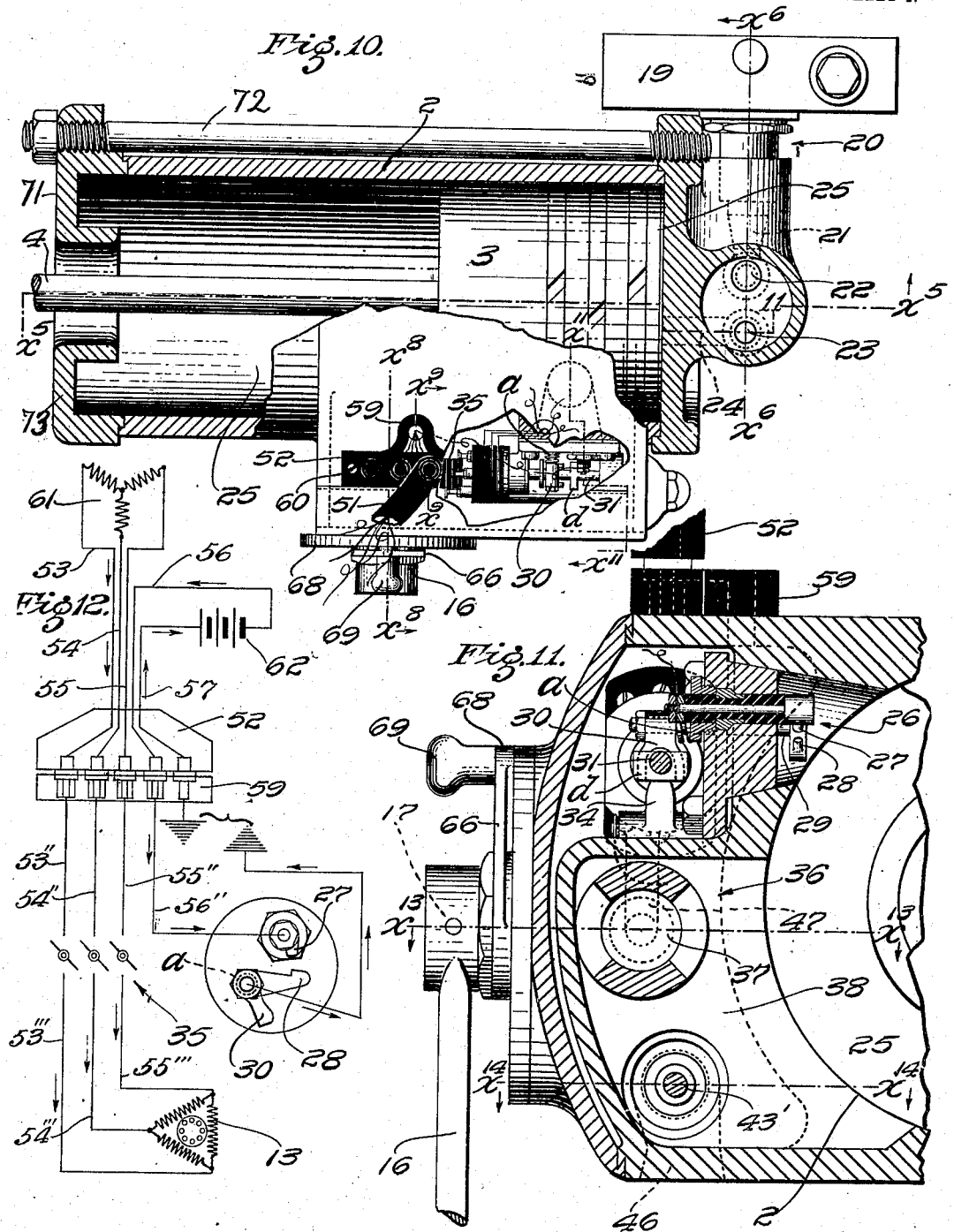

M. C. WHITE & O. C. DURYEA.
POWER APPLIANCE.
APPLICATION FILED JUNE 11, 1908.

911,187.

Patented Feb. 2, 1909.
5 SHEETS—SHEET 5.

Witnesses:
H. N. Kirkby
Julia Townsend

Inventors
Morris C. White
Otho C. Duryea
by James R. Townsend
their Atty.

UNITED STATES PATENT OFFICE.

MORRIS C. WHITE AND OTHO C. DURYEA, OF LOS ANGELES, CALIFORNIA, ASSIGNORS TO AMERICAN GAS TOOL COMPANY, OF PHOENIX, ARIZONA TERRITORY, A CORPORATION OF ARIZONA TERRITORY.

POWER APPLIANCE.

No. 911,187.  Specification of Letters Patent.  Patented Feb. 2, 1909.

Application filed June 11, 1908. Serial No. 437,961.

*To all whom it may concern:*

Be it known that we, MORRIS COLUMBUS WHITE and OTHO CROMWELL DURYEA, both citizens of the United States, residing at Los Angeles, in the county of Los Angeles and State of California, have invented a new and useful Power Appliance, of which the following is a specification.

This invention relates to improvements in the construction of internal-combustion power-appliances for riveting, die-operating, punching, shearing, pressing, briqueting and other machines of a character wherein the particular work to be performed may be accomplished, or is intended preferably to be accomplished, by a single progressive movement of a tool, or work-performing member, operated under great pressure.

Our object is to provide certain improvements in the construction of machines of the class described for the purpose of rendering them particularly rapid, certain and powerful in operation.

In carrying out our invention we provide an internal combustion cylinder, a piston therein, a work performing member operatively connected with the piston, means for compressing an explosive charge in the cylinder behind the piston, charge igniting means and means for exhausting the products of combustion. We may also employ pressure multiplying means, as a toggle-mechanism, between the power-piston and work-performing member.

In the construction herein shown we provide an electrically actuated pump for forcing the explosive mixture into the cylinder and for compressing it to the degree desired in each separate instance. We also provide improved means for positively controlling the degree of compression of the explosive mixture at the time of explosion, and also means for automatically igniting the charge when compressed to the desired degree. We also provide other improvements in details of construction and combinations of parts all as hereinafter set forth.

For the purpose of illustrating our improvements we show them in one desirable form when applied to a riveting machine.

Figure 1:
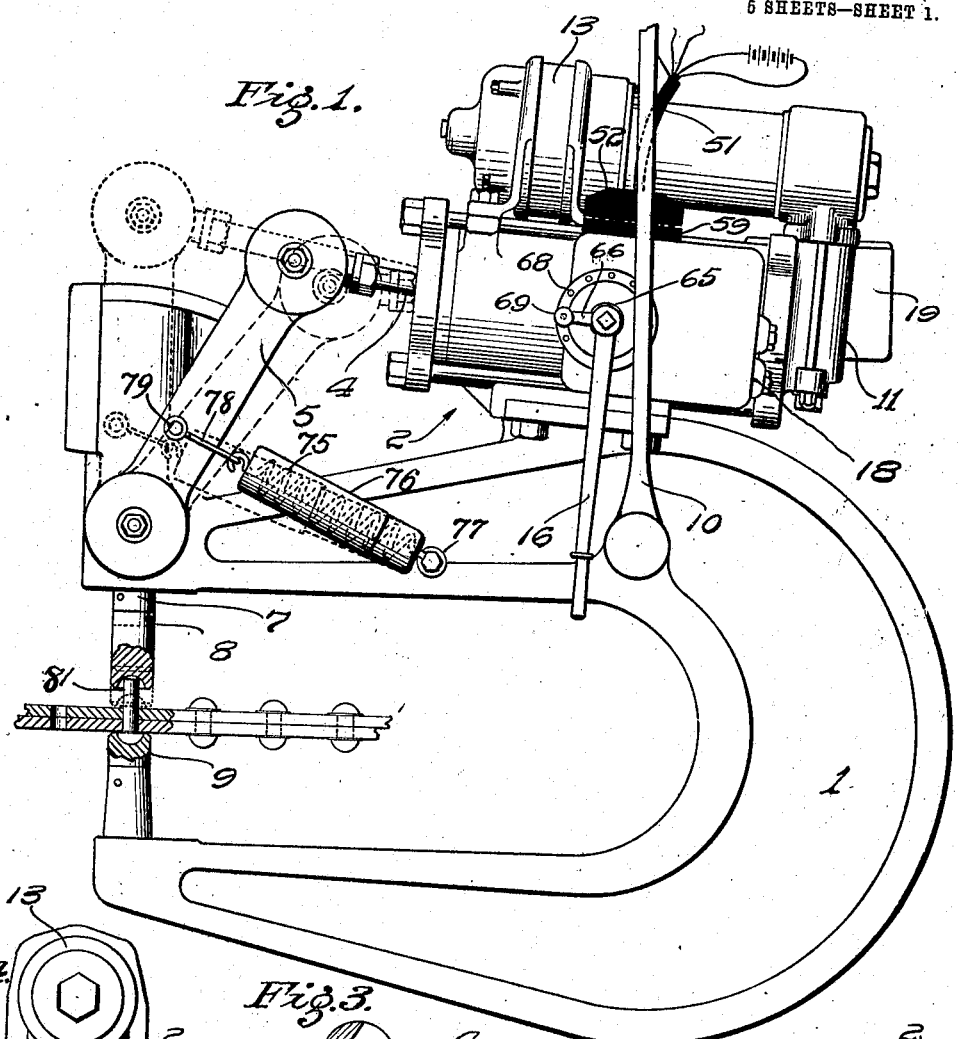
Figure 4:
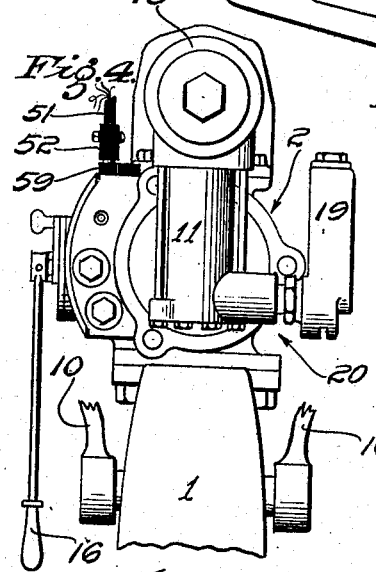
Figure 3:
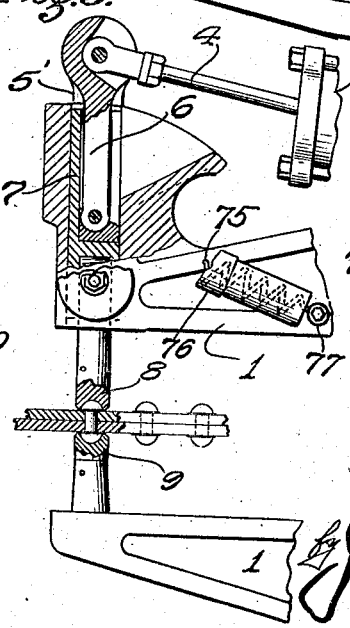
Figure 2:
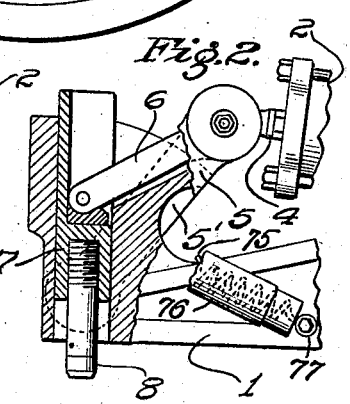
Figure 13:
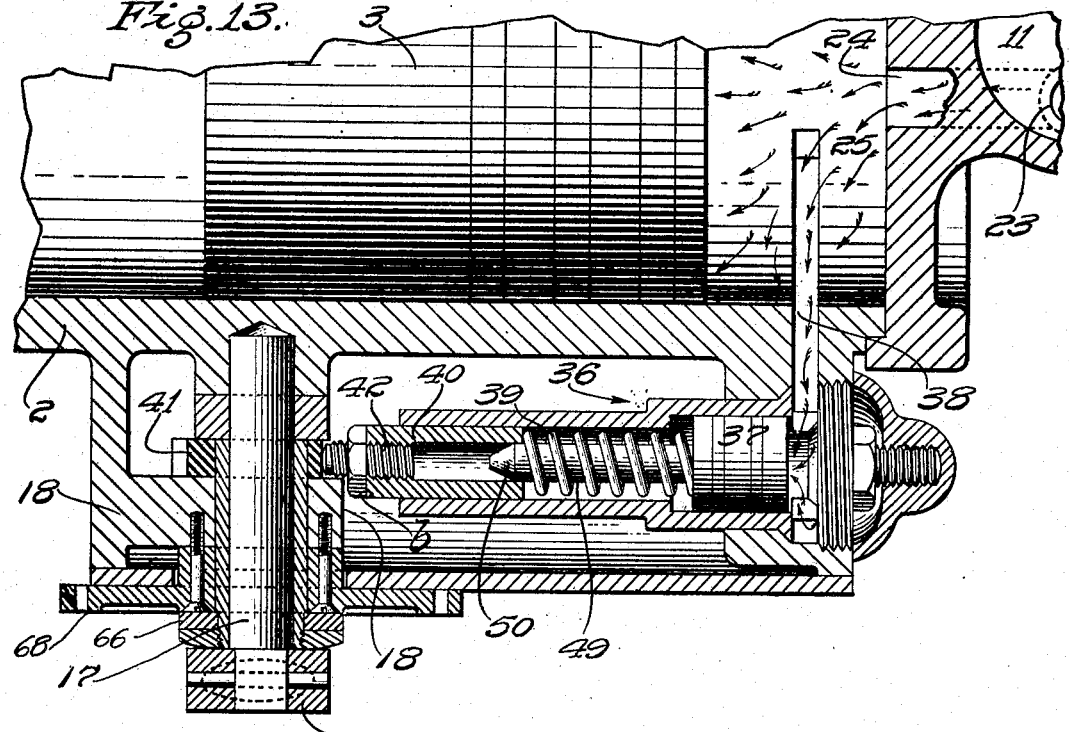
Figure 14:
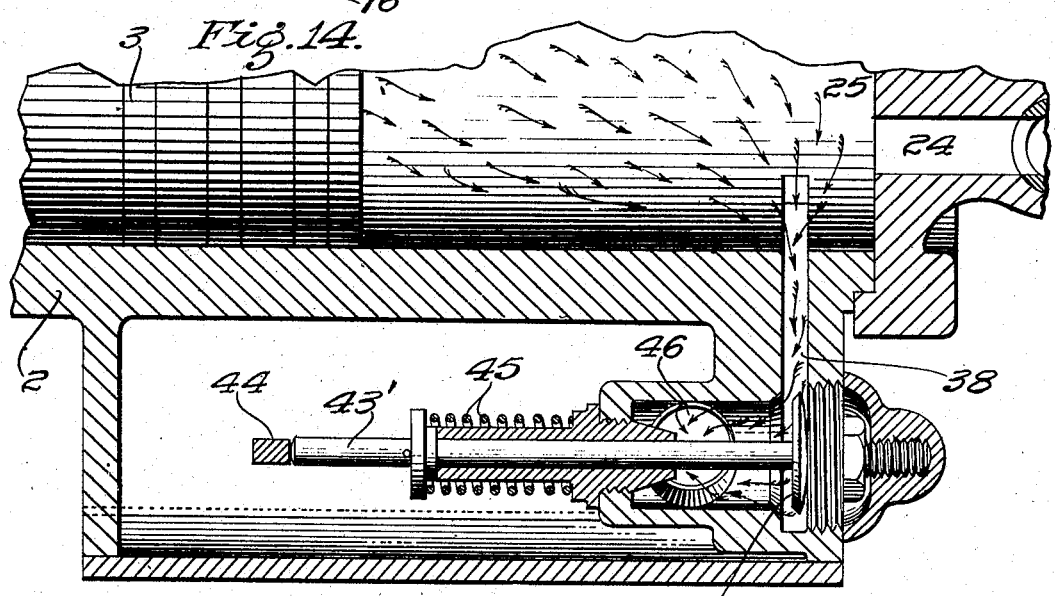

Referring to the accompanying drawings—Figure 1 is a partly broken side elevation of the machine, showing our internal combustion power-generator, and a toggle-mechanism, as pressure multiplying means, between the power-generator and work performing member, or tool, different positions of the toggle mechanism and attendant parts being indicated by full and dotted lines; Figs. 2 and 3, broken and partly sectional fragmentary views illustrating the operations of the toggle mechanism and the manner of setting a rivet; Fig. 4, a broken rear elevation of the upper part of the machine; Fig. 5, an enlarged view of the power-generating portion of the machine, the view being partly in elevation, partly diagrammatic and partly in section on line $X^5$ in Fig. 6, corresponding with line $X^5$ in Fig. 10. Fig. 6 a cross section on lines $X^6$ in Figs. 5 and 10; Fig. 7, a further enlarged broken and partly sectional view showing mechanisms, housed within a controlling box for regulating the admission of explosive mixture to the main cylinder, its pressure against the power piston, its explosion and its exhaust; Fig. 8, a broken section taken on line $X^8$ in Fig. 7, corresponding with the same lines in Figs. 5 and 10; Fig. 9, a broken section on lines $X^9$ in Figs. 7 and 10; Fig. 10 a broken and partly sectional plan-view taken on line $X^{10}$ in Fig. 5. Fig. 11, a broken section taken on irregular line $X^{11}$ in Fig. 7, corresponding with the same lines in Figs. 5 and 10. Fig. 12 a diagram illustrating the electric circuit employed; and Figs. 13 and 14 plan sections taken respectively on lines $X^{13}$ and $X^{14}$ in Fig. 7, corresponding with the same lines in Figs. 5, 6, 8 and 11.

Mounted upon the yoke-frame 1 is an internal-combustion cylinder 2 containing a trunk piston 3 having a connecting rod 4. Connected with the free end of the rod 4 are two companion toggle-links 5, $5^1$, pivotally secured at their opposite ends to the yoke frame. Also pivotally connected with the end of the rod 4 is a power-link 6 which, at its opposite end is pivotally connected with a work-performing ram, or tool holder 7, sliding in a guide through the end of the yoke frame. Fastened in the tool-holder 7 is a rivet heading die-member 8 to coöperate with a die-member 9 mounted upon the anvil-portion of the yoke-frame 1. The machine illustrated is of the portable type equipped with a bail 10 by means of which it may be suspended and in which it may be turned to different angles in the vertical plane. On the rear end of the cylinder 2 is a pump cylinder 11 containing a piston 12. On the top of the cylinder 2 is an electric motor 13 having a shaft 14 provided with a crank 15 with which the stem of the piston 12 is connected.

On one side of the machine is an operating lever 16 fitting removably upon the squared projecting end of a rock-shaft 17 journaled in a bracket $18^1$ forming an integral part of a controlling-box casing 18 cast upon the side of the cylinder 2. At one side of the pump-cylinder 11 is a tank 19 for holding gasolene, or the like, and 20 is an air and gas mixing device connected with the fuel tank 19 (see Fig. 6) and adapted to supply the explosive mixture to the pump-cylinder 11 through a port 21 and inlet-valve 22. The discharge valve 23 of the pump communicates through a port 24 with the inner end, or combustion-chamber portion 25, of the cylinder 2. In the end of the cylinder 2 is an igniter 26, of the make and break type, having a stationary contact-point 27 and a movable contact-point 28. The contact-point 28 is upon a rock-shaft 29 actuated to rock in one direction by a return spring $a$ and having an arm 30 projecting, in the controlling-box, between collars or lugs $c$ $d$ carried by a longitudinal sliding rod 31, as most plainly shown in Fig. 7. The rod 31 at one end is in the path of an arm 32, carried by the shaft 17, to be moved thereby longitudinally in one direction against the resistance of a return-spring 33. In the movement of the rod 31 under pressure from the arm 32 the lug or stop $d$ moves away from the arm 30, permitting the spring $a$ (see Fig. 10) to turn the shaft 29 and move the contact-point 28 to the contact-point 27, thereby closing the sparker-circuit, hereinafter described. The return-spring 33 tends to hold the rod 31 in one extreme position, indicated in Fig. 7, wherein the lug or collar $c$ bears against a stationary guide in the controlling-box. As hereinafter explained, the movement of the rod 31, under pressure from the arm 32, also operates to close the circuit of the pump-actuating motor 13 to start the pump; and the breaking of the said circuits, to stop the pump and operate the igniter, occurs in the return movement of the rod 31 under the action of the spring 33.
Mounted upon a pin beneath the rod 31 is a swinging spring-pressed latch 34 adapted to engage the lug $d$ and hold the rod 31 in the position to which it is pressed by the arm 32. The rod 31 carries a motor-circuit switch 35. 36 is a cylinder, in the controlling-box, containing a piston or plunger 37 and in open communication, through a port 38, with the interior of the cylinder 2. A spring 39 tends to press the piston in the direction of the port 38, the spring being tensioned by a sliding sleeve 40. Operating against the end of the sleeve 40, to press it in the direction of compressing the spring 39, is a cam 41 which engages an adjustable screw 42 in the end of the sleeve. The screw may be locked in adjusted position by means of a jam-nut $b$.

43 is an exhaust-valve having a stem $43^1$, the end of which is in position to be engaged by an arm 44 carried by the rock-shaft 17. The arms 32 and 44 project from opposite sides of the shaft 17 and are respectively arranged to engage the rod 31 and the exhaust-valve stem 43 in reverse movements of the shaft 17 brought about by the lever 16. The exhaust-valve is held to its seat by a spring 45 and when opened permits the cylinder to exhaust to the outlet 46. The outlet 46 is threaded to receive an exhaust-pipe, if desired.

The swinging latch 34 is in the form of a lever, the arm 47 of which extends, through a slot in the cylinder 36 and a slot 48 in the sleeve 40, into the path of a tapered end 50 of the piston-stem 49. The tapered part 50 operates as a cam to move against the end of the arm 47 and swing the latch to withdraw it from the lug or stop $d$, and thereby release the rod 31 to permit its return by the spring 33. The piston 37 is moved by the pressure of the explosive fluid in the cylinder 2, to seat against a shoulder $36^1$, whenever the said pressure exceeds the force of the tensioned spring 39, the tension of the spring being regulated by the position of the cam 41.

In the drawings the apparatus is shown provided with a tri-phase motor for operating the pump, and with means for connecting the motor with a tri-phase generator. 51 is a cable terminating in an insulating block 52. The cable contains the conductor wires 53, 54, 55, 56 and 57 leading to conducting plugs $53^1$, $54^1$, $55^1$, $56^1$ and $57^1$. 58 designates bushings for the plugs in an insulating plate 59 fastened to the casing 18 by screws 60. The plugs $53^1$, $54^1$ and $55^1$ are connected with a generator 61 through the conductors 53, 54, 55; and the plug $56^1$ is connected by means of the conductor 56 with one side of a source of electrical energy as the sparker-battery 62. The plug $57^1$ passes through the insulating plate 59 to connect the casing 18 with the ground side of the battery through the conductor 57. The bushings of the plugs $53^1$, $54^1$, 55 are connected through conductors $53^{11}$, $54^{11}$ and $55^{11}$ with the stationary contacts 64 of the switch 35. $64^1$ are stationary contacts of the switch 35 connected with the pump-motor 13 through conductors $53^{111}$, $54^{111}$ $55^{111}$. The contacts 63 are upon insulated spring arms $35^1$, $35^{11}$, $35^{111}$ carried by the rod 31, and they are movable into engagement with the companion contacts 64, $64^1$ to connect the generator 61 with the motor 13, when the rod 31 is moved by means of the arm 32, until locked by engagement of the swinging latch 34 with the stop $d$, as shown in Fig. 5.

The cam 41 is upon the end portion of a rocking sleeve 65, loosely surrounding the rock shaft 17; and secured to the outer end portion of the said sleeve is a short lever 66 provided with a spring catch 67. Extending through an opening in the casing 18 and fastened against the bracket $18^1$ is a stationary sleeve, surrounding the rocking-sleeve 65, and carrying a stationary dial-plate 68 having graduated openings or sockets to be engaged by the catch 67. The catch 67, which is of the plunger type, (see Fig. 8) passes through an inner sleeve on the lever 66; and surrounding said sleeve, to slide thereon, is a handle 69 to which the catch 67 is secured at its outer end. A confined spring housed within the handle and surrounding the said sleeve operates to move the catch into a socket of the dial 68 when it registers therewith. When it is desired to cause the catch to release a socket of the dial this may be done by a slight outward pull upon the handle 69. Turning of the lever 66, by means of the handle 69 along the dial plate 68, turns the sleeve 65 and cam 41. Thus when turned in one direction the handle causes the cam to increase the tension of the spring 39, and when turned in the opposite direction it turns the cam 41 to diminish the tension of the spring 39. The cam is adjustable upon the sleeve 65 and may be secured in adjusted position by means of a set-screw 70.

The head 71 of the cylinder 2 is fastened in place by tie-bolts 72, and is formed with an annular socket or dash-pot 73 adapted to receive and fit closely the end of the piston 3. Thus when the piston moves outward under the force of an explosion its outer annular end portion enters the dash-pot 73 which forms an air-cushion. The cushioning of the piston prevents its impacting against the head 71 under any circumstances.

On one side of the yoke frame is resilient means for returning the piston, toggle and attendant parts to initial position when the cylinder is exhausted after an explosion. This means comprises a spring 75 incased in a telescoping housing 76 which is connected by a stud 77 to the yoke-frame 1. At its opposite end the spring is connected by means of a link 78 with a stud 79 on the link 5.

Normally the operating lever 16 hangs of its own weight in the vertical plane, the arms 32 and 44 being out of contact with the ends of the rods 31 and 43'. The force of an explosion against the piston in the cylinder depends upon the degree of compression to which the explosive mixture has been raised previous to the explosion. It will be understood, in riveting, for example, that rivets of different diameters will require different degrees of pressure to properly set them. Too little pressure would not accomplish the object in a single operation and too great pressure would crowd the rivet unduly, thereby tending to expand and weaken the material around the rivet. Other reasons might be given why in riveting, for example, the pressure applied to the work should be neither too light nor too heavy. The graduated sockets in the dial plate indicate the positions to which the handle 69 must be turned to insure the desired degree of compression in the cylinder at the time of an explosion. The operator therefore, knowing in advance what pressure is required for the particular operation, turns the handle 69 to the proper position upon the dial. He then swings the lever 16 toward the left, in Figs. 1 and 5, causing the arm 32 to move the rod 31 until caught by engagement of the catch 34 with the stop $d$. This movement of the rod closes the switch 35 and permits the sparker points of the ignition device to be closed together, as described. While the catch 34 holds the parts locked in this position the motor operates the pump to force explosive mixture into the cylinder behind the piston. The power of the return spring 75 is little more than sufficient to return the parts to initial position after an exhaust, and as pressure accumulates in the cylinder under the force of the pump the piston is moved and moves the toggle-mechanism against the resistance of the spring 75 until the work-performing member, or die, 8, contacts with the rivet 81, as indicated by full lines in Fig. 1. The piston is thus positively stopped against further travel and the pump continues to raise the pressure in the cylinder behind the piston. This pressure bears also against the piston 37, through the port 38, and when the pressure overcomes the tension of the spring 39, the piston 37 is moved to the stop or shoulder 36', causing the cam-shaped end 50 of the rod 49 to engage and turn the catch 34 out of engagement with the stop $d$. This release of the stop causes the rod 31 to be moved quickly to the left in Figs. 5 and 7, thereby opening the switch 35 and causing the motor and pump to stop. Simultaneously with the stopping of the pump, or practically so, the stop $d$ contacts with and swings the lever 30 to separate the points of the igniter-device and produce a spark which effects explosion of the compressed mixture in the cylinder. The pressure of the pumped fluid, which effects initial contact of the work-producing member with the work, as described, by squeezing the relatively moving members of the toggle and attendant mechanisms together, avoids all lost motion between the members when an explosion occurs. Thus the force of the explosion, from the very beginning, is directed against the work through the power multiplying toggle-mechanism and results in great pressure, of a controlled degree, being exerted against the work.

After setting a rivet it is often desirable to maintain great pressure thereon until it has cooled somewhat. Although rather rapid reduction of pressure occurs in the cylinder, after the force of the explosion has reached its maximum, the toggle-links will, while in their extended position, prolong the pressure upon the rivet. As soon as desired, after an explosion, the operator swings the lever 16 to the right, in Figs. 1 and 5, causing the arm 44 to engage the stem 43' of the exhaust-valve and open the latter. The spring 75 then operates to return the parts to initial position, causing the piston 3 to scavenge the cylinder.

While we prefer to construct our improvements throughout as shown and described, they may be variously modified in the matter of details and combinations of parts without departing from the spirit of our invention as defined by the claims.

What we claim as new and desire to secure by Letters Patent is—

1. In a machine of the character described, the combination of a cylinder, a piston therein, a work-performing member operatively connected with the piston, motor-operated means for compressing an explosive charge in the cylinder behind the piston at regulable intervals under the control of the operator, and means for igniting the compressed charge.

2. In a machine of the character described, the combination of a cylinder, a piston therein, a work-performing member operatively connected with the piston, an electrically operated motor compressor for compressing an explosive charge in the cylinder behind the piston, and means for igniting the compressed charge.

3. In a machine of the character described, the combination of a cylinder, a piston therein, a work-performing member operatively connected with the piston, manually controlled motor operated means for compressing an explosive charge in the cylinder behind the piston at regulable intervals under the control of the operator, and means for igniting the compressed charge.

4. In a machine of the character described, the combination of a cylinder, a piston therein, a work-performing member operatively connected with the piston, means for compressing an explosive charge in the cylinder behind the piston, and means actuated by the pressure of the charge to stop the further compression thereof when such pressure approximates a predetermined limit.

5. In a machine of the character described, the combination of a cylinder, a piston therein, a work-performing member operatively connected with the piston, means for supplying a compressed explosive charge to the cylinder behind the piston, and means operating automatically to stop further supply and ignite the charge when the pressure of the charge in the cylinder approximates a predetermined limit.

6. In a machine of the character described, the combination of a cylinder, a piston therein, a work-performing member operatively connected with the piston, means for supplying a compressed explosive charge to the cylinder behind the piston, means operating automatically to stop further supply and ignite the charge when the pressure of the charge in the cylinder approximates a predetermined limit, and means for varying said limit.

7. In a machine of the character described, the combination of a cylinder, a piston therein, a work-performing member operatively connected with the piston, a power-operated pump for compressing an explosive charge in the cylinder behind the piston, manually controlled means for starting the pump, and means operating automatically to stop the pump and ignite the charge when the pressure of the charge approximates a predetermined limit.

8. In a machine of the character described, the combination of a cylinder, a piston therein, a work-performing member operatively connected with the piston, a power-operated pump for compressing an explosive charge in the cylinder behind the piston, manually controlled means for starting the pump, means operating automatically to stop the pump and ignite the charge when the pressure of the charge approximates a predetermined limit, and means for varying said limit.

9. In a machine of the character described, the combination of a cylinder, a piston therein, a work-performing member operatively connected with the piston, a pump for compressing an explosive charge in the cylinder behind the piston, an electric motor for operating said pump, means for closing the motor circuit, and means operating automatically to break said circuit to stop the pump when the pressure of the charge approximates a predetermined limit.

10. In a machine of the character described, the combination of a cylinder, a piston therein, a work-performing member operatively connected with the piston, a pump for compressing an explosive charge in the cylinder behind the piston, an electric motor for operating said pump, electric sparking means for igniting said charge, means for closing the motor and sparking circuits, and means operating automatically to break said circuits to stop the pump and ignite the charge when the pressure of the charge approximates a predetermined limit.

11. In a machine of the character described, the combination of a cylinder, a piston therein, a work-performing member operatively connected with the piston, a power-operated pump for compressing an explosive charge in the cylinder behind the piston, a single means for igniting the compressed charge and stopping the pump, the starting of the pump and exhausting of the charge being under the direct control of the operator.

12. In a machine of the character described, the combination of a cylinder, a piston therein, a work-performing member operatively connected with the piston, a power-operated pump for compressing an explosive charge in the cylinder behind the piston, and means for igniting the compressed charge and stopping the pump, the starting of the pump and exhausting of the charge being under the direct control of the operator through the medium of a single manually operated lever.

13. In a machine of the character described, the combination of a cylinder, a piston therein, a work-performing member operatively connected with the piston, a pump for compressing an explosive charge in the cylinder behind the piston, a pump-actuating electric motor, an electric sparker for igniting said charge, an operating handle, means, in the path of movement of said handle in one direction, for closing the motor and sparker circuits, means actuated by the pressure of the charge to break said circuits, to stop the motor and ignite the charge, when the pressure of the charge approximates a predetermined limit, and exhausting means for the cylinder in the path of said handle.

14. In a machine of the character described, the combination of a cylinder, a piston therein, a work-performing member operatively connected with the piston, means for compressing an explosive charge in the cylinder behind the piston, an electric sparker for igniting the compressed charge, manually operated means for closing the sparker-circuit, catch mechanism for locking said circuit-closing means in contact, and means operating automatically to release said catch mechanism to open said circuit and ignite the charge when the pressure of the charge approximates a predetermined limit.

15. In a machine of the character described, the combination of a cylinder, a piston therein, a work-performing member operatively connected with the piston, a pump for compressing an explosive charge in the cylinder behind the piston, an electric-motor for operating said pump, electric-sparking means for igniting said charge, means for closing the motor and sparker circuits, catch mechanism for locking said circuits closed, and means operating automatically to release said catch mechanism to open said circuits and thereby stop the motor and ignite the charge when the pressure of the charge approximates a predetermined limit.

16. In a machine of the character described, the combination of a cylinder, a piston therein, a work-performing member operatively connected with the piston, a pump for compressing an explosive charge in the cylinder behind the piston, an electric motor for operating said pump, a sliding spring returned rod, a motor circuit, opening and closing means on the rod for the motor circuit, an electric sparking device for igniting said charge in the path of movement of said rod, a lever for moving said rod to effect closing of said circuits, catch mechanism for locking said rod in its circuit closing position, and regulable means operating automatically when the pressure of the charge approximates a predetermined limit to release said catch mechanism and permit return of the rod to open said circuits and thereby stop the motor and ignite the charge.

17. In a machine of the character described, the combination of a main cylinder, a piston therein, a work-performing member operatively connected with the piston, means for compressing an explosive charge in the main cylinder, an electric-sparker, an operating handle movable to effect closure of the sparker-circuit, a plunger-cylinder, a plunger in the plunger-cylinder exposed at one end to the pressure in the main-cylinder to be moved thereby in one direction, a catch for locking said circuit closed arranged in the path of said plunger and adapted to be released in said movement thereof, a return-spring for the plunger, a tensioning cam for the spring, an adjusting handle for the cam, and a pressure indicating dial across the face of which the handle is movable, whereby the approximate degree of the desired compression of the charge and its ignition is regulated, as set forth.

In testimony whereof, we have hereunto set our hands at Los Angeles, California this 28th day of May, 1908.

MORRIS C. WHITE.
OTHO C. DURYEA.

In presence of—
JAMES R. TOWNSEND,
M. BEULAH TOWNSEND.